United States Patent
Kelkar et al.

(10) Patent No.: US 7,045,056 B2
(45) Date of Patent: May 16, 2006

(54) CO OXIDATION PROMOTERS FOR USE IN FCC PROCESSES

(75) Inventors: Chandrasbekhar Pandurang Kelkar, Bridgewater, NJ (US); Yuejin Li, Edison, NJ (US); Rostam J. Madon, Flemington, NJ (US); Marius Vaarkamp, Cypress, TX (US)

(73) Assignee: Engelhard Corporation, Iselin, NJ (US)

( * ) Notice: Subject to any disclaimer, the term of this patent is extended or adjusted under 35 U.S.C. 154(b) by 459 days.

(21) Appl. No.: 10/268,256

(22) Filed: Oct. 10, 2002

(65) Prior Publication Data

US 2004/0072675 A1  Apr. 15, 2004

(51) Int. Cl.
- C10G 11/00 (2006.01)
- C10G 11/02 (2006.01)
- B01J 23/10 (2006.01)
- B01J 23/38 (2006.01)

(52) U.S. Cl. .......... 208/113; 208/120.01; 502/302; 502/304; 502/325; 502/344

(58) Field of Classification Search ........... 208/113, 208/120.01; 502/302, 304, 325, 344
See application file for complete search history.

(56) References Cited

U.S. PATENT DOCUMENTS

| | | | | |
|---|---|---|---|---|
| 3,957,689 A | | 5/1976 | Ostermaier et al. | 252/455 Z |
| 4,072,600 A | | 2/1978 | Schwartz | 208/120 |
| 4,088,568 A | | 5/1978 | Schwartz | 208/121 |
| 4,107,032 A | | 8/1978 | Chester | 208/120 |
| 4,153,535 A | | 5/1979 | Vasalos et al. | 208/120 |
| 4,171,286 A | | 10/1979 | Dight et al. | 252/455 |
| 4,199,435 A | | 4/1980 | Chessmore et al. | 208/113 |
| 4,222,856 A | | 9/1980 | Hansel et al. | 208/120 |
| 4,290,878 A | | 9/1981 | Blanton, Jr. | 208/120 |
| 4,300,997 A | | 11/1981 | Meguerian | 208/120 |
| 4,350,614 A | | 9/1982 | Schwartz | 252/455 |
| 4,458,023 A | | 7/1984 | Welsh et al. | 502/65 |
| 4,469,589 A | | 9/1984 | Yoo et al. | 208/120 |
| 4,472,267 A | | 9/1984 | Yoo et al. | 208/120 |
| 4,492,678 A | | 1/1985 | Yoo et al. | 423/244 |
| 4,495,304 A | | 1/1985 | Yoo et al. | 502/66 |
| 4,495,305 A | | 1/1985 | Yoo et al. | 502/65 |
| 4,497,902 A | * | 2/1985 | Bertolacini et al. | 502/65 |
| 4,499,197 A | | 2/1985 | Seese et al. | 502/65 |
| 4,542,118 A | | 9/1985 | Nozemack et al. | 502/65 |
| 4,544,645 A | | 10/1985 | Klaassen | 502/66 |
| 4,608,357 A | | 8/1986 | Silverman et al. | 502/84 |
| 4,628,042 A | | 12/1986 | Speronello | 502/263 |
| 4,686,204 A | * | 8/1987 | Mester et al. | 502/406 |
| 4,728,635 A | | 3/1988 | Bhattacharyya et al. | 502/304 |
| 4,790,982 A | | 12/1988 | Yoo et al. | 423/239 |
| 4,839,026 A | * | 6/1989 | Brown et al. | 208/120.01 |
| 4,847,225 A | | 7/1989 | Lussier | 502/68 |
| 5,002,654 A | | 3/1991 | Chin | 208/121 |
| 5,021,146 A | | 6/1991 | Chin | 208/122 |
| 5,037,538 A | | 8/1991 | Chin et al. | 208/113 |
| 5,085,762 A | | 2/1992 | Absil et al. | 208/120 |
| 5,110,780 A | | 5/1992 | Peters | 502/303 |
| 5,164,072 A | | 11/1992 | Peters | 208/122 |
| 5,194,413 A | | 3/1993 | Kumar | 502/65 |
| 5,364,517 A | | 11/1994 | Dieckmann et al. | 208/121 |
| 5,443,807 A | | 8/1995 | Tang et al. | 423/247 |
| 5,500,198 A | | 3/1996 | Liu et al. | 423/246 |
| 5,565,181 A | | 10/1996 | Dieckmann et al. | 423/239.1 |
| 5,565,399 A | | 10/1996 | Fraenkel et al. | 502/304 |
| 5,591,418 A | | 1/1997 | Bhattacharyya et al. | 423/239.1 |
| 5,750,020 A | | 5/1998 | Bhattacharyya et al. | 208/113 |
| 6,107,240 A | | 8/2000 | Wu et al. | 502/304 |
| 6,117,813 A | | 9/2000 | McCauley | 502/303 |
| 6,129,834 A | | 10/2000 | Peters et al. | 208/120.01 |
| 6,143,167 A | | 11/2000 | Peters et al. | 208/113 |
| 6,165,933 A | | 12/2000 | Peters et al. | 502/330 |
| 6,358,881 B1 | | 3/2002 | Peters et al. | 502/304 |
| 2002/0061273 A1 | | 5/2002 | Lin | 423/247 |

FOREIGN PATENT DOCUMENTS

ES  2 092 429  11/1996
WO  WO 95/03876  2/1995

OTHER PUBLICATIONS

U.S. Appl. No. 10/001,485, filed Nov. 23, 2001, Kelkar et al.

* cited by examiner

*Primary Examiner*—Walter D. Griffin
(74) *Attorney, Agent, or Firm*—Raymond F. Keller

(57) ABSTRACT

A composition for controlling CO and $NO_x$ emissions during FCC processes comprises (i) acidic oxide support, (ii) cerium oxide, (iii) lanthanide oxide other than ceria such as praseodymium oxide (iv), optionally, oxide of a metal from Groups Ib and IIb such as copper, silver and zinc and (v) precious metal such as Pt and Pd.

33 Claims, No Drawings

CO OXIDATION PROMOTERS FOR USE IN FCC PROCESSES

BACKGROUND OF THE INVENTION

A major industrial problem involves the development of efficient methods for reducing the concentration of air pollutants, such as carbon monoxide, sulfur oxides and nitrogen oxides in waste gas streams which result from the processing and combustion of sulfur, carbon and nitrogen containing fuels. The discharge of these waste gas streams into the atmosphere is environmentally undesirable at the sulfur oxide, carbon monoxide and nitrogen oxide concentrations that are frequently encountered in conventional operations. The regeneration of cracking catalyst, which has been deactivated by coke deposits in the catalytic cracking of sulfur and nitrogen containing hydrocarbon feedstocks, is a typical example of a process which can result in a waste gas stream containing relatively high levels of carbon monoxide, sulfur and nitrogen oxides.

Catalytic cracking of heavy petroleum fractions is one of the major refining operations employed in the conversion of crude petroleum oils to useful products such as the fuels utilized by internal combustion engines. In fluidized catalytic cracking (FCC) processes, high molecular weight hydrocarbon liquids and vapors are contacted with hot, finely-divided, solid catalyst particles, either in a fluidized bed reactor or in an elongated transfer line reactor, and maintained at an elevated temperature in a fluidized or dispersed state for a period of time sufficient to effect the desired degree of cracking to lower molecular weight hydrocarbons of the kind typically present in motor gasoline and distillate fuels.

In the catalytic cracking of hydrocarbons, some nonvolatile carbonaceous material or coke is deposited on the catalyst particles. Coke comprises highly condensed aromatic hydrocarbons and generally contains from about 4 to about 10 weight percent hydrogen. When the hydrocarbon feedstock contains organic sulfur and nitrogen compounds, the coke also contains sulfur and nitrogen. As coke accumulates on the cracking catalyst, the activity of the catalyst for cracking and the selectivity of the catalyst for producing gasoline blending stocks diminishes. Catalyst which has become substantially deactivated through the deposit of coke is continuously withdrawn from the reaction zone. This deactivated catalyst is conveyed to a stripping zone where volatile deposits are removed with an inert gas at elevated temperatures. The catalyst particles are then reactivated to essentially their original capabilities by substantial removal of the coke deposits in a suitable regeneration process. Regenerated catalyst is then continuously returned to the reaction zone to repeat the cycle.

Catalyst regeneration is accomplished by burning the coke deposits from the catalyst surfaces with an oxygen containing gas such as air. The combustion of these coke deposits can be regarded, in a simplified manner, as the oxidation of carbon and the products are carbon monoxide and carbon dioxide.

High residual concentrations of carbon monoxide in flue gases from regenerators have been a problem since the inception of catalytic cracking processes. The evolution of FCC has resulted in the use of increasingly high temperatures in FCC regenerators in order to achieve the required low carbon levels in the regenerated crystalline aluminosilicate catalysts. Typically, present day regenerators now operate at temperatures in the range of about 1100° F. to 1350° F. when no promoter is used and result in flue gases having a $CO_2/CO$ ratio in the range of 1.5 to 0.8. The oxidation of carbon monoxide is highly exothermic and can result in so-called "carbon monoxide afterburning" which can take place in the dilute catalyst phase, in the cyclones or in the flue gas lines. Afterburning has caused significant damage to plant equipment. On the other hand, unburned carbon monoxide in atmosphere-vented flue gases represents a loss of flue value and is ecologically undesirable.

Restrictions on the amount of carbon monoxide, which can be exhausted into the atmosphere and the process advantages resulting from more complete oxidation of carbon monoxide, have stimulated several approaches to the provision of means for achieving complete combustion of carbon monoxide in the regenerator.

The use of precious metals to catalyze oxidation of carbon monoxide in the regenerators of FCC units has gained broad commercial acceptance. Some of the history of this development is set forth in U.S. Pat. Nos. 4,171,286 and 4,222,856. In the earlier stages of the development, the precious metal was deposited on the particles of cracking catalyst. Present practice is generally to supply a promoter in the form of solid fluidizable particles containing a precious metal, such particles being physically separate from the particles of cracking catalyst. The precious metal or compound thereof, is supported on particles of suitable carrier material and the promoter particles are usually introduced into the regenerator separately from the particles of cracking catalyst. The particles of promoter are not removed from the system as fines and are cocirculated with cracking catalyst particles during the cracking/stripping/regeneration cycles. Judgement of the CO combustion efficiency of a promoter is done by measuring the difference in temperature, delta T, between the (hotter) dilute phase and the dense phase.

Promoter products used on a commercial basis in FCC units include calcined spray dried porous microspheres of kaolin clay impregnated with a small amount (e.g., 100 or 500 ppm) of platinum. Reference is made to U.S. Pat. No. 4,171,286 (supra). Most commercially used promoters are obtained by impregnating a source of platinum on microspheres of high purity porous alumina, typically gamma alumina. The selection of platinum as the precious metal in various commercial products appears to reflect a preference for this metal that is consistent with prior art disclosures that platinum is the most effective group VIII metal for carbon monoxide oxidation promotion in FCC regenerators. See, for example, FIG. 3 in U.S. Pat. No. 4,107,032 and the same figure in U.S. Pat. No. 4,350,614. The figure illustrates the effect of increasing the concentration of various species of precious metal promoters from 0.5 to 10 ppm on $CO_2/CO$ ratio.

U.S. Pat. No. 4,608,357 teaches that palladium is unusually effective in promoting the oxidation of carbon monoxide to carbon dioxide under conditions such as those that prevail in the regenerators of FCC units when the palladium is supported on particles of a specific form of silica-alumina, namely leached mullite. The palladium may be the sole catalytically active metal component of the promoter or it may be mixed with other metals such as platinum.

U.S. Pat. Nos. 5,164,072 and 5,110,780, relate to an FCC CO promoter having Pt on La-stabilized alumina, preferably about 4–8 weight percent $La_2O_3$. It is disclosed that ceria "must be excluded." At col. 3, it is disclosed that "In the presence of an adequate amount of $La_2O_3$, say about 6–8 percent, 2 percent Ce is useless. It is actually harmful if the $La_2O_3$ is less." In an illustrative example '072 and '780 demonstrates an adverse effect of 8% Ce on CO promotion of platinum supported on a gamma alumina and a positive effect of La.

When sulfur and nitrogen containing feedstocks are utilized in catalytic cracking process, the coke deposited on the catalyst contains sulfur and nitrogen. During regeneration of coked deactivated catalyst, the coke is burned from the catalyst surface that then results in the conversion of sulfur to sulfur oxides and nitrogen to nitrogen oxides.

Unfortunately, the more active combustion promoters such as platinum and palladium also serve to promote the formation of nitrogen oxides in the regeneration zone. Since the discharge of nitrogen oxides into the atmosphere is environmentally undesirable, the use of these promoters has the effect of substituting one undesirable emission for another. It has been reported that the use of prior art CO promoters can cause a dramatic increase (e.g. >300%) in $NO_x$.

Various approaches have been used to either reduce the formation of noxious gases or treat them after they are formed. Most typically, additives have been used either as an integral part of the FCC catalyst particles or as separate particles in admixture with the FCC catalyst.

Various additives have been developed that will carry out CO promotion while controlling NOx emissions.

U.S. Pat. Nos. 4,350,614, 4,072,600 and 4,088,568 mention rare earth addition to Pt based CO promoters. An example is 4% REO that shows some advantage. There is no teaching of any effect of REO on decreasing NOx emissions from the FCCU.

U.S. Pat. No. 4,199,435 teaches a combustion promoter selected from the Pt, Pd, Ir, Os, Ru, Rh, Re and copper on an inorganic support.

U.S. Pat. No. 4,290,878 teaches a Pt—Ir and Pt—Rh bimetallic promoter that reduces NOx compared to conventional Pt promoter.

U.S. Pat. No. 4,300,997 patent teaches the use of a Pd—Ru promoter for oxidation of CO that does not cause excessive NOx formation.

U.S. Pat. No. 4,544,645 describes a bimetallic of Pd with every other Group VIII metal but Ru.

U.S. Pat. Nos. 6,165,933 and 6,358,881 describe compositions comprising a component containing (i) an acidic oxide support, (ii) an alkali metal and/or alkaline earth metal or mixtures thereof, (iii) a transition metal oxide having oxygen storage capability, and (iv) palladium; to promote CO combustion in FCC processes while minimizing the formation of NOx.

U.S. Pat. No. 6,117,813 teaches a CO promoter consisting of a Group VIII transition metal oxide, Group IIIB transition metal oxide and Group IIA metal oxide.

There is still a need, however, for improved CO oxidation promoters having $NO_x$ emission control in FCC processes.

SUMMARY OF THE INVENTION

The invention provides novel compositions suitable for use in FCC processes that are capable of providing improved CO oxidation promotion activity along with NOx emission control.

In one aspect, the invention provides compositions for reducing CO emissions in FCC processes, the compositions containing (i) an acidic oxide support, (ii) ceria (iii) at least one oxide of a lanthanide series element other than ceria, (iv), optionally, at least one oxide of a transition metal selected from Groups Ib and IIb of the Periodic Table and (v) at least one precious metal. The acidic oxide support preferably contains alumina. Praseodymium oxide is the preferred lanthanide oxide other than ceria. Cu and Ag are preferred Group Ib transition metals and Zn is the preferred Group IIb transition metal.

In another aspect, the invention encompasses FCC processes using the CO emission reduction and $NO_x$ control compositions of this invention either as an integral part of the FCC catalyst particles or as separate particles admixed with the FCC catalyst.

These and other aspects of the invention are described in further detail below.

DETAILED DESCRIPTION OF THE INVENTION

The invention encompasses the discovery that certain classes of compositions are very effective for both the reduction of CO and control of $NO_x$ gas emissions in FCC processes. The CO reduction compositions of the inventions are characterized in that they comprise (i) an acidic oxide support, (ii) cerium oxide (iii) at least one oxide of a lanthanide series element other than ceria, (iv), optionally, at least one oxide of a transition metal selected from Groups Ib and IIb of the Periodic Table and mixtures thereof and (v) at least one precious metal.

The acidic oxide support should be of sufficient acidity for the composition to act as an effective additive for CO oxidation promotion and $NO_x$ control. Acidic oxide catalyst supports are well know to those of ordinary skill in the art and include, for example, transitional aluminas such as gamma and eta alumina, silica-stabilized versions of said aluminas, including the silica-stabilized alumina spinel formed by leaching silica from kaolin calcined through its characteristic exotherm to form the spinel, or mullite. The support may be crystalline or amorphous. Preferably, the acidic oxide support contains at least some alumina. More preferably, the oxide support contains at least 50 wt. % alumina. The oxide support is preferably an oxide selected from the group consisting of alumina and silica-alumina. Where an amorphous silica-alumina support is used, the support preferably has an alumina to silica molar ratio of from about 1:1 up to about 50:1. Examples of commercially available acidic oxide alumina supports are available under tradenames such as PURALOX, CATAPAL and VERSAL. Examples of commercially available acidic silica-alumina supports are available under the tradenames such as SIRAL and SIRALOX.

The silica-alumina support can optionally be created by the caustic leaching of silica from preformed kaolin microspheres as described in U.S. Pat. Nos. 4,847,225 and 4,628,042, which are hereby incorporated by reference for their teachings in this regard. Preferably, the kaolin that is subject to caustic leaching is calcined substantially through its characteristic exotherm to form spinel and/or mullite. More preferably, the caustic leached kaolin support is a microsphere whereby the caustic leached kaolin is bound with aluminum chlorohydroxide before calcination through the exotherm.

The acidic oxide support further preferably has sufficient surface area to facilitate CO oxidation promotion and control. Preferably, the oxide support has a surface area of at least about 20 $m^2/g$, more preferably from about 50 up to about 300 $m^2/g$. The acidic oxide support may be a powder which is preferable when used as an integral part of the FCC catalyst or a microsphere or particle, preferably when used as an admixture with FCC catalysts.

The amount of the cerium oxide (ceria) present in the additive composition of the present invention may be varied considerably relative to the amount of acidic oxide support. Preferably, the additive composition contains at least about 0.5 part by weight of cerium oxide per 100 parts by weight of the acidic oxide support material, more preferably from at least about 1 part by weight up to about 25 parts by weight of cerium oxide per 100 parts of the acidic oxide support material.

The lanthanide oxides other than ceria include at least one metal oxide from the lanthanide series other than ceria. Preferably, the lanthanide oxide other than ceria is praseodymium oxide. The amount of the lanthanide oxide other than ceria present in the additive composition may be varied considerably relative to the amount of acidic oxide support. Preferably, the additive composition contains from at least about 0.05 part by weight of oxide per 100 parts by weight of the acidic oxide support material, more preferably from at least about 1 part by weight up to about 25 parts by weight of lanthanide oxide other than ceria mixture per 100 parts of the acidic oxide support material. The amount of ceria to the lanthanide oxides other than ceria present in the additive composition of this invention ranges from 1:20 to 20:1 by weight, preferably 1:10 to 10:1.

The Group Ib and/or IIb transition metals may be any metal or combination of metals selected from those groups of the Periodic Table. Preferably, the transition metal is selected from the group consisting of Cu, Ag, Zn and mixtures thereof. The amount of transition metal present is preferably at least about 100 parts by weight (measured as metal oxide) per million parts of the oxide support material, more preferably from about 0.1 up to about 5 parts by weight per 100 parts of the oxide support material.

The amount of precious metal can be varied considerably depending the level of CO combustion promotion desired. Typical levels of precious metal will be in the range of 50 to 1500 ppm of total additive and/or catalyst. As used herein the precious metals include those selected from a group consisting of Pt, Pd, Ir, Os, Ru, Rh, Re and their precursors such as salts and amine complexes and mixtures thereof, preferably the precious metal is Pt, Pd or mixtures thereof.

The additive composition may contain minor amounts of other materials, which preferably do not adversely affect the CO oxidation or $NO_x$ control function in a significant way. Reference herein to $NO_x$ control typically refers to the reduction of $NO_x$ emissions from the FCC process, although other types of control are contemplated by this invention including, for example, the maintenance of the $NO_x$ emission levels in the FCC unit where increased emissions of $NO_x$ are expected. The additive composition may consist essentially of items (i)–(v) mentioned above, item (iv) being optional. Where the composition of the invention is used as an additive particle for an FCC process (as opposed to being integrated into the FCC catalyst particles themselves), the additive composition may be combined with fillers (e.g. clay, silica-alumina, silica and/or alumina particles) and/or binders (e.g. silica sol, alumina sol, silica alumina sol, etc.) to form particles suitable for use in an FCC process, preferably by spray drying before the calcination of step. More preferably, porous particles, also known as microspheres, are formed from acidic oxide support typically by spray drying powdered oxide support material combined with a binder/filler before or after impregnation with the individual constituents. Preferably, any added binders or fillers used do not significantly adversely affect the performance of the additive component.

Where the additive composition is used as an additive particulate (as opposed to being integrated into the FCC catalyst particles themselves), the amount of additive component in the additive particles is preferably at least 50 wt %, more preferably at least 75 wt. %. Most preferably, the additive particles consist entirely of the additive component. The additive particles are preferably of a size suitable for circulation with the catalyst inventory in an FCC process. The additive particles preferably have an average particle size of about 20–200 µm. The additive particles preferably have attrition characteristics such that they can withstand the severe environment of an FCCU.

As previously mentioned the additive composition of the invention may be integrated into the FCC catalyst particles themselves. In such case, any conventional FCC catalyst particle components may be used in combination with the additive composition of the invention. If integrated into the FCC catalyst particles the additive composition of the invention preferably represents at least about 0.02 wt. % the FCC catalyst particle.

While the invention is not limited to any particular method of manufacture, the additive composition of the invention is preferably made by the following procedures:
(a) co-impregnate the acidic oxide support particles with a cerium oxide source, at least one lanthanide oxide source other than ceria, and, optionally, at least one source of a Group 1b/IIb element.
(b) calcine the impregnated support of step (a)
(c) impregnate the formed material in step (b) with the desired level and choice of precious metal or precursor salt or complex,
(d) optionally, recalcine the impregnated additive from step (c).

The sources of oxides are preferably slurries, sols and/or solutions of the metal oxides themselves or salts of the respective metals, which decompose to oxides on calcination, or combinations of oxides and salts. If desired, the individual constituents may be separately added to the support particles with a calcination step in between each addition. The calcination steps are preferably performed at about 450–750° C.

The additive composition may be used as a separate additive particle or as an integral part of an FCC catalyst particle. If used as an additive, the additive component may itself be formed into particles suitable for use in a FCC process. Alternatively, the additive component may be combined with binders, fillers, etc. by any conventional technique. See for example, the process described in U.S. Pat. No. 5,194,413, the disclosure of which is incorporated herein by reference.

Where the additive component of the invention is integrated into an FCC catalyst particle, preferably the component is first formed and then combined with the other constituents which make up the FCC catalyst particle. Incorporation of the additive composition directly into FCC catalyst particles may be accomplished by any known technique. Examples of suitable techniques for this purpose are disclosed in U.S. Pat. Nos. 3,957,689; 4,499,197; 4,542,188 and 4,458,623, the disclosures of which are incorporated herein by reference.

Preferably, the compositions of this invention do not contain alkali and/or alkaline earth metals. The absence of alkali and/or alkaline earth metals in the additive compositions of this invention is intended to mean that they are substantially absent from such compositions so as not to which preferably do not adversely affect the CO oxidation or $NO_x$ control function of such compositions in a significant way. Typically, the absence of the amount of alkali and/or alkaline earth metals shall mean less than about 1%, preferably, less than about 0.5% and, more preferably, less than about 0.1% alkali and alkaline earth metal present in the additive compositions of this invention.

The compositions of the invention may be used in any conventional FCC process. Typical FCC processes are conducted at reaction temperatures of 450 to 650° C. with catalyst regeneration temperatures of 600 to 850° C. The compositions of the invention may be used in FCC processing of any typical hydrocarbon feedstocks. Preferably, the compositions of the invention are used in FCC processes involving the cracking of hydrocarbon feedstocks which contain above average amounts of nitrogen, especially residual feedstocks or feedstocks having a nitrogen content of at least 0.1 wt. %. The amount of the additive component of the invention used may vary depending on the specific FCC process. Preferably, the amount of additive component used (in the circulating inventory) is about 0.05–15 wt. % based on the weight of the FCC catalyst in the circulating catalyst inventory. The presence of the compositions of the invention during the FCC process catalyst regeneration step dramatically reduces the level of CO emitted during regeneration and controls $NO_x$ emissions as well.

The following examples are illustrative of embodiments of the invention and are not intended to limit the invention as encompassed by the claims forming part of the application.

EXAMPLE 1

2% $Pr_6O_{11}$/10% CeO2/2% CuO/Alumina

Alumina support particles are coimpregnated with a solution of cerium and praseodymium nitrate by incipient wetness, dried and calcined at 1200° F. for 2 hours to achieve a 10% $CeO_2$ and 2 wt % $Pr_6O_{11}$ level. On the microsphere, copper nitrate is impregnated, dried and calcined at 1200° F. for 2 hours to achieve a 2 wt % CuO level.

EXAMPLE 2

3% $Pr_6O_{11}$/18% $CeO_2$/0.5% CuO/Alumina

Alumina support particles are coimpregnated with a solution of cerium and praseodymium nitrate by incipient wetness, dried and calcined at 1200° F. for 2 hours to achieve a 18% $CeO_2$ and 3 wt % $Pr_6O_{11}$ level. To achieve these levels of Ce and Pr the impregnation and calcination steps were conducted twice. On the resulting microsphere, copper nitrate is impregnated, dried and calcined at 1200° F. for 2 hours to achieve a 0.5 wt % CuO level.

EXAMPLE 3

2% $Pr_6O_{11}$/10% CeO2/Alumina

Alumina support particles are coimpregnated with a solution of cerium and praseodymium nitrate by incipient wetness, dried and calcined at 1200° F. for 2 hours to achieve a 10% $CeO_2$ and 2 wt % $Pr_6O_{11}$ level.

EXAMPLE 4

Platinum is impregnated on the product made in Example 1 to a level of 500 ppm from a water solution of monoethanol amine complex. The dried material is calcined at 1200° F. for 2 h.

EXAMPLE 5

Platinum is impregnated on product made in Example 2 to a level of 500 ppm from a water solution of monoethanol amine complex. The dried material is calcined at 1200° F. for 2 h.

EXAMPLE 6

Platinum is impregnated on product made in Example 2 to a level of 200 ppm from a water solution of monoethanol amine complex. The dried material is calcined at 1200° F. for 2 h.

EXAMPLE 7

Platinum is impregnated on product made in Example 3 to a level of 500 ppm from a water solution of monoethanol amine complex. The dried material is calcined at 1200° F. for 2 h.

EXAMPLE 8

Palladium is impregnated on product made in Example 2 to a level of 500 ppm from a water solution of nitrate salt. The dried material is calcined at 1200° F. for 2 h.

EXAMPLE 9

Palladium is impregnated on product made in Example 3 to a level of 500 ppm from a water solution of nitrate salt. The dried material is calcined at 1200° F. for 2 h.

COMPARATIVE EXAMPLES

Example A 500 ppm Pt on Alumina

Platinum is impregnated on alumina microspheres to a level of 500 ppm from a water solution of ethanol amine salt. The dried material is calcined at 1200° F. for 2 h.

Example B 500 ppm Pd on Alumina

Palladium is impregnated on alumina microspheres to a level of 500 ppm from a water solution of nitrate salt. The dried material is calcined at 1200° F. for 2 h.

CO Oxidation Testing

The additives tested are deactivated by steaming a 50/50 blend of additive with FCC catalyst at 1500° F. for 4 hours in 100% steam. Chemical markers are used to ensure that the blend composition is retained after steaming. CO oxidation testing is done in a fluid bed with a gas stream that has 5% $CO$/3% $O_2$/5% $CO_2$/balance $N_2$ at 1100° F. Different CO conversions are achieved by varying the additive charged to the fluid bed reactor. Activity is defined as the slope of $-\ln(1-x)$ vs. space time where x is the conversion of CO. Data from the CO oxidation activity testing is shown in Table 1.

TABLE 1

|  | Activity |
| --- | --- |
| Example 5 | 159 |
| Comparative Example A | 55 |

Results from Table 1 show that additive compositions from the present invention having comparable precious metal loadings have better CO promotion activity than prior art materials.

NOx Reduction

A fixed fluid bed laboratory reactor is used. The additives are deactivated by steaming at 1500° F. for 4 hours in 100% steam. A blend containing 0.2 wt % of the additive with a low metal ECAT is used for testing. Coke is deposited on the blend by cracking gas oil. The spent catalyst is regenerated at 1300° F. in air. NOx emissions from the resulting flue gas are determined via chemiluminescence. The NOx emissions are reported at constant coke. Typical results for NOx reduction are shown in Table 2.

TABLE 2

|  | NOx reduction (%) |
| --- | --- |
| Comparative Example A | Base |
| Example 5 | 17 |
| Example 6 | 28 |

Results from Table 2 show that additive compositions from the present invention reduce NOx emissions when compared with additives from prior art.

We claim:

1. An additive composition suitable for reducing CO emissions during catalyst regeneration in a fluid catalytic cracking process, said composition comprising (i) an acidic oxide support, (ii) cerium oxide, (iii) at least one oxide of a lanthanide series element other than cerium oxide, wherein the weight ratio of (ii) to (iii) is from about 5:1 to about 20:1, (iv), optionally, at least one oxide of a transition metal selected from Groups Ib and IIb of the Periodic Table and mixtures thereof and (v) at least one precious metal.

2. The composition of claim 1 wherein said acidic oxide support is selected from the group consisting of alumina and silica-alumina.

3. The composition of claim 2 wherein said acidic oxide support is alumina.

4. The composition of claim 2 wherein said acidic oxide support is silica-alumina.

5. The composition of claim 4 wherein said silica alumina has an alumina:silica mole ratio of from about 1:1 up to about 50:1.

6. The composition of claim 4 wherein the said silica-alumina is prepared by caustic leaching of silica from calcined kaolin.

7. The composition of claim 4 wherein the said silica-alumina is prepared by caustic leaching of silica from kaolin calcined through its characteristic exotherm.

8. The composition of claim 7 wherein the caustic leached kaolin support is a microsphere whereby the caustic leached kaolin is bound with aluminum chlorohydroxide before calcination through its characteristic exotherm.

9. The composition of claim 1 wherein said Group Ib and IIb transition metals are present in said composition and are selected from the group consisting of copper, silver, zinc and mixtures thereof.

10. The composition of claim 1 wherein said cerium oxide is present in amounts of from at least about 0.5 part by weight per 100 parts by weight of said acidic oxide support.

11. The composition of claim 1 wherein the precious metal is at least one of the group consisting of Pt and Pd and the amount of precious metal in said composition is at least about 50 and less than about 1500 ppm.

12. The composition of claim 1 wherein said cerium oxide is present in amounts of from at least about 2 up to 25 parts by weight per 100 parts by weight of said acidic oxide support.

13. The composition of claim 1 wherein said oxide of a lanthanide series element other than cerium oxide is praseodymium oxide.

14. The composition of claim 13 wherein the amount of ceria to praseodymium oxide ranges from about 6:1 to about 20:1 by weight.

15. The composition of claim 13 wherein the amount of ceria to praseodymium oxide ranges from about 6:1 to about 10:1 by weight.

16. The composition of claim 1 wherein there is a substantial absence of alkali and/or alkaline earth metals in said composition.

17. A fluid cracking catalyst composition comprising (a) a cracking component suitable for catalyzing the cracking of hydrocarbons, and (b) an additive composition comprising (i) an acidic oxide support, (ii) cerium oxide, (iii) at least one oxide of a lanthanide series element other than ceria, the weight ratio of (ii) to (iii) being from about 5:1 to about 20:1, (iv), optionally, at least one oxide of a transition metal selected from Groups Ib and IIb of the Periodic Table and (v) at least one precious metal, said additive composition being an integral component of the catalyst composition particles, being separate particles from the catalyst component or mixtures thereof and being present in the cracking catalyst in a sufficient CO emission reducing amount.

18. The cracking catalyst of claim 17 wherein said cracking catalyst comprises an admixture of component (a) and component (b).

19. The cracking catalyst of claim 17 wherein said cracking catalyst comprises integral particles which contain both component (a) and component (b).

20. The cracking catalyst of claim 17 wherein the additive component (b) comprises about 0.05 to 15 wt % of the cracking catalyst composition.

21. The cracking catalyst of claim 17 wherein said oxide of a lanthanide series element other than ceria is praseodymium oxide.

22. The composition of claim 17 wherein the precious metal is at least one of the group consisting of Pt and Pd and the amount of precious metal in said composition is at least about 50 and less than about 1500 ppm.

23. The composition of claim 17 wherein there is an absence of alkali and/or alkaline earth metals in said composition.

24. A method of reducing CO emission during fluid catalytic cracking of a hydrocarbon feedstock into lower molecular weight components, said method comprising contacting a hydrocarbon feedstock with a cracking catalyst suitable for catalyzing the cracking of hydrocarbons at elevated temperature whereby lower molecular weight hydrocarbon components are formed in the presence of a CO emission reduction composition, wherein said composition comprises (i) an acidic oxide support, (ii) at least 0.5 part by weight of cerium oxide per 100 parts by weight of acidic oxide support, (iii) at least one oxide of a lanthanide series element other than ceria, the weight ratio of (ii) to (iii) being from about 5:1 to about 20:1, (iv) optionally, an oxide of a transition metal selected from Groups Ib and IIb of the Periodic Table and (v) at least one precious metal, said CO reduction composition being present in an amount sufficient to reduce said CO emissions.

25. The method of claim 24 wherein said cracking catalyst and CO reduction composition comprises an admixture of separated cracking catalyst component and CO emission reduction composition component.

26. The method of claim 24 wherein said cracking catalyst and CO reduction composition comprises an integral combination of the cracking catalyst component and the CO reduction composition component.

27. The method of claim 24 wherein said cracking catalyst is fluidized during contact with a hydrocarbon feedstock.

28. The method of claim 27 further comprising recovering used cracking catalyst from said contacting step and treating said used catalyst under conditions to regenerate said catalyst.

29. The method of claim 24 wherein said hydrocarbon feedstock contains at least 0.1 wt % nitrogen.

30. The method of claim 24 wherein said at least one oxide of a lanthanide series element other than ceria is praseodymium oxide.

31. The method of claim 30 wherein the amount of cerium oxide to praseodymium oxide ranges from about 6:1 to about 20:1 by weight.

32. The method of claim 24 wherein the precious metal is at least one of the group consisting of Pt and Pd and the amount of precious metal in said composition is at least about 50 and less than about 1500 ppm.

33. The method of claim 24 wherein there is an absence of alkali and/or alkaline earth metals in said composition.

* * * * *